Figures 1, 2:
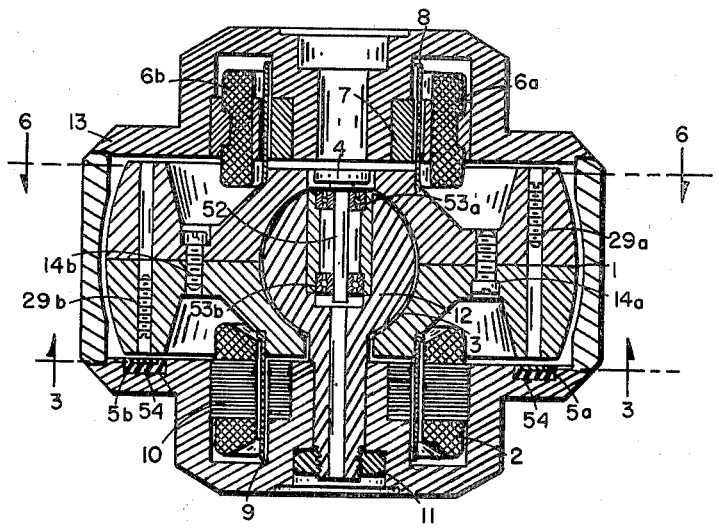

May 17, 1966  D. B. DUNCAN ETAL  3,251,233
FREE ROTOR GYROSCOPE
Filed Feb. 21, 1957  4 Sheets-Sheet 1

INVENTORS.
DONAL B. DUNCAN
JOSEPH C. BOLTINGHOUSE
BY

ATTORNEY

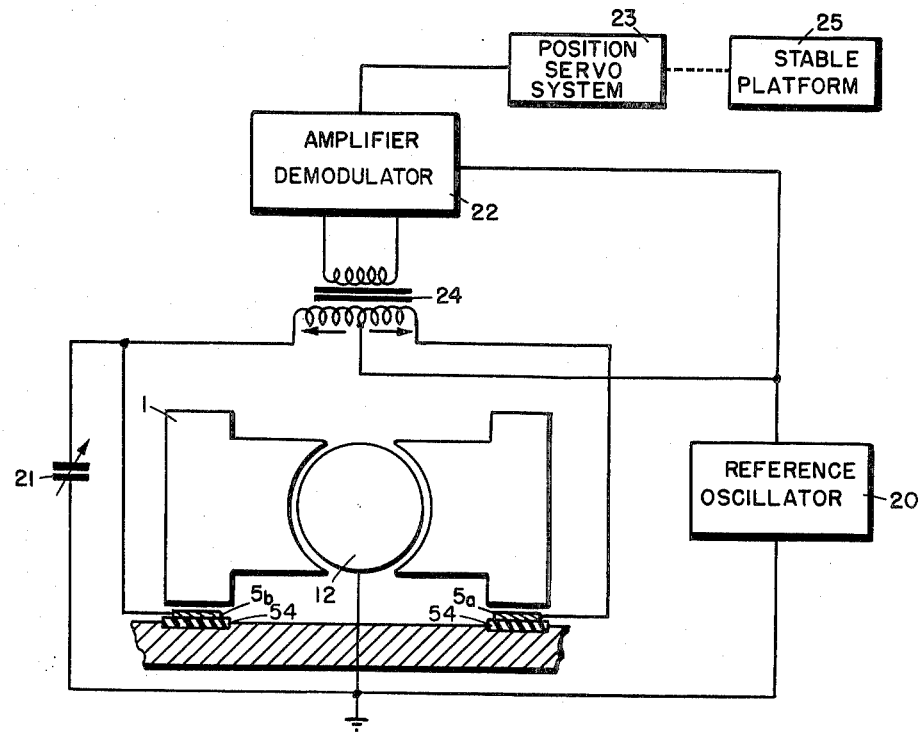
FIG. 4
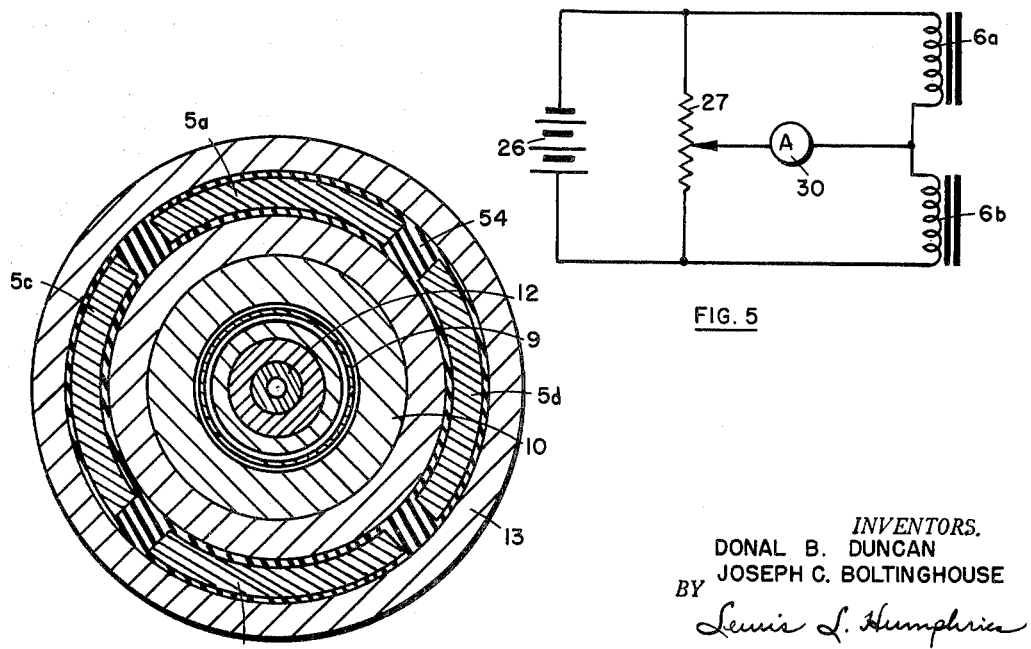
FIG. 3
FIG. 5
INVENTORS.
DONAL B. DUNCAN
JOSEPH C. BOLTINGHOUSE
BY Lewis L. Humphries
ATTORNEY

INVENTORS.
DONAL B. DUNCAN
JOSEPH C. BOLTINGHOUSE

ATTORNEY

United States Patent Office 3,251,233
Patented May 17, 1966

3,251,233
FREE ROTOR GYROSCOPE
Donal B. Duncan, Arcadia, and Joseph C. Boltinghouse, Whittier, Calif., assignors to North American Aviation, Inc.
Filed Feb. 21, 1957, Ser. No. 641,720
8 Claims. (Cl. 74—5.46)

This invention relates to gyroscopes, and more particularly to a gyroscope with a free rotor supported by a spherical gas bearing. A free rotor gyroscope is one which spins on a bearing which permits three degrees of angular freedom of the rotor about its support. A gas bearing is most readily suited for the support of such a free rotor. This gas bearing is, in some instances, pressure fed from an external compressor, and, in others, it is self-lubricated by hydrodynamic action.

The free rotor gyro has several advantages over conventional gyroscopes. Vibration and bearing noise can be made practically non-existent with a gas spin bearing, and since little or no wear occurs, high reliability and long life are possible. In addition, a free rotor gyro permits outputs on two axes, namely those normal to the spin axis and normal to each other. Therefore, to obtain outputs for all three axes in space, only two such gyroscopes with their rotor spin axes normal to each other are required.

While the advantages of the free rotor gyroscope are apparent, it has been impossible to achieve anywhere near the accuracy required for such an application as the stabilization of an inertial navigator platform, with any such device heretofore available. The features of the device of this invention for the first time enable the construction of a free rotor gyroscope which will meet such critical requirements. Basically, this accuracy is achieved by using a highly sensitive capacitive pickoff system formed between a closely spaced gyroscope case and rotor. The output signal from these pickoffs drives follow-up servos in such a manner that the platform base is maintained precisely in alignment with the rotor axis at all times. In order to use such close spacing between the rotor and case without undesirable contact between the two, the mechanical freedom of the rotor spin axis relative to the case is limited to several milliradians. Positive limitation of motion to such a degree without undesirable friction between moving and nonmoving parts presented a difficult problem. After much investigation and experimentation, a special rotatable stop device was designed which restricts motion without producing undesirable friction between the rotor and its case.

Through the combination of the above-described features in the device of this invention, a free rotor gyroscope of extreme stability which will work satisfactorily in the most demanding situations, is possible. Therefore, an object of this invention is to provide an improved free rotor gyroscope.

A further object of this invention is to provide an improved gyroscope with two-axis output.

A still further object of this invention is to provide a gyroscope which for a given accuracy requirement lends itself to more compact construction.

Another object of this invention is to provide a highly accurate gyroscope of greater reliability over long periods of operation.

An additional object of this invention is to provide a highly accurate gyroscope of simpler construction.

Still another object of this invention is to provide a gyroscope requiring less driving power than equivalent devices.

Figure 6:
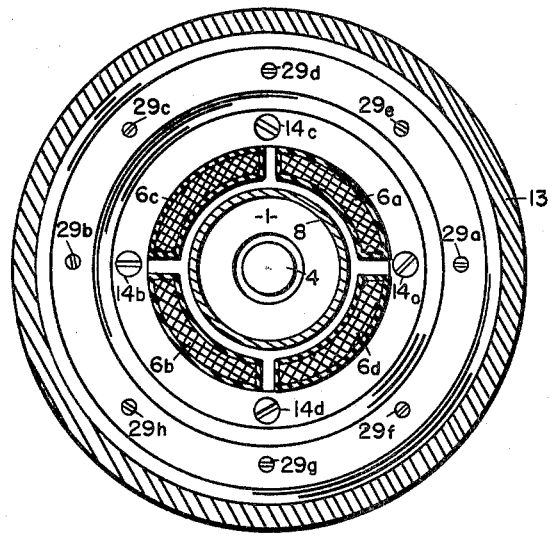
Figure 7:
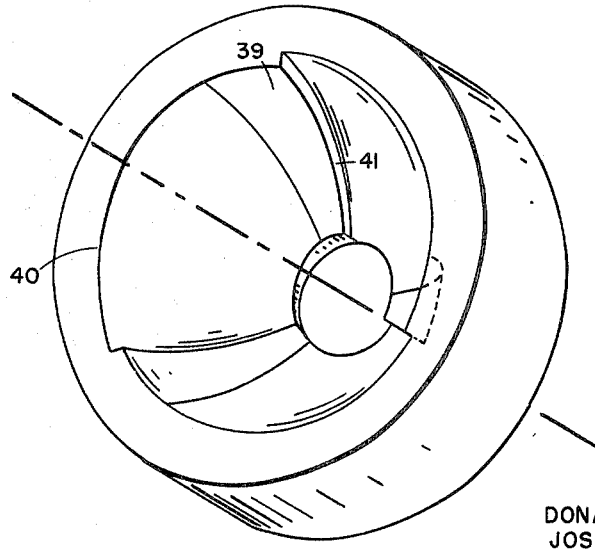
Figure 8:
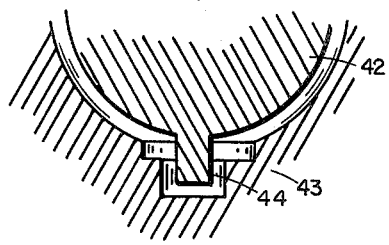
Figure 9:
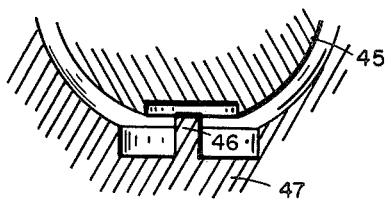
Figure 10:
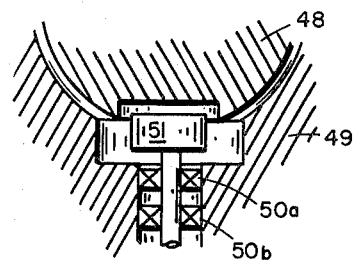

Other objects of this invention will become apparent from the following description taken in connection with the accompanying drawings in which:

FIG. 1 shows an elevation cross section of an embodiment of the invention utilizing an electromagnetic rotor drive in which the gas bearing is between the rotor and a fixed center ball to which the rotor is concentric, FIG. 2 shows an elevation cross section of an embodiment of the invention with an electromagnetic rotor drive in which the rotor consists of a centrally located sphere and the air bearing is formed between this sphere and the surrounding case, FIG. 3 shows a bottom cross section of an embodiment of the invention represented as cut by a plane 3—3 as indicated in FIG. 1, FIG. 4 is a schematic of the capacitor pickoff circuitry, FIG. 5 is a schematic of the circuitry for the eddy current torquer, FIG. 6 shows a top cross section of an embodiment of the invention represented as cut by a plane 6—6 as indicated in FIG. 1, FIG. 7 illustrates thrust pads etched on the inner surfaces of the rotor, FIGS. 8 and 9 illustrate types of fixed stop pins, And FIG. 10 illustrates a freely rotatable stop pin.

Referring to FIG. 1, an embodiment of the gyroscope is shown comprising a rotor 1 supported by spherical gas bearing 3 which is located between fixed center ball support 12 and the rotor. Case 13 encloses the device and should be properly sealed if the gas used is other than air or if the air bearing is pressurized. The center ball support is attached to mount 11 which is fixedly supported by the case. Center ball support 12 is, then, an extension of case 13 and is cantilevered thereto. The radial clearance between the ball and rotor is very small and would be, for example, about .0003 inch with a ball support 1³⁄₁₆ inches in diameter. The bearing can be auto-lubricated (i.e. it can operate without external pressurization, the supporting gas film being self-generated by the spinning rotor), or provisions can be made to pressurize it. A gas such as helium may be used in place of air to cut down windage torques. Since helium has substantially the same viscosity as air, but lower density, it serves this purpose without a loss of support for the rotor.

Tapered pads as illustrated in FIG. 7 are etched by chemical means into those surfaces of the rotor concentric with the center ball to support the thrust loads. These pads consist of surface sectors or lands 39 separated by inclined wedge-shaped sectors 40, and are described in North American Aviation co-pending application of Joseph S. Acterman, Serial No. 416,995, filed March 18, 1954, and now abandoned, entitled Autolubricated Gas Thrust Bearing. A preferred form of this bearing has three equally spaced lands around the circumference with the wedge-shaped portions extending about 96° and the lands 24°. Maximum depth 41 of the wedges for a rotor with a 1³⁄₁₆ inch inner diameter would be about .0003 inch. In operation, a load supporting layer of gas is automatically generated by the shearing action which takes place in the gap between the complementary surfaces in the spinning rotor and the center ball. The use of such thrust pads enables satisfactory operation of the gyroscope with its rotation axis in any plane, and is essential where the device is to be operated in a rapidly maneuvering vehicle. Another form is one in which the wedge sectors such as 40 are of uniform depth. Or, still another, one in which the depressions are formed in the center ball.

Referring to FIGS. 1 and 3, motor stator windings 2 provide the electromagnetic drive force for rotor 1 and are excited by an alternating current source (not shown). Flux ring 10 of laminated silicon steel which is fixedly mounted on the case 13 provides a flux path for the rotating magnetic field generated by the stator windings.

Copper sleeve 9 is attached to the rotor 1. Eddy currents are produced in this copper sleeve by the magnetic field generated by the field windings acting in conjunction with the flux ring. These eddy currents generate a magnetic field which coacts with the field generated by the field windings and flux ring to produce a drive torque for the rotor.

In the embodiment shown in FIG. 1, the rotor is fabricated in two identical halves to facilitate assembling the gyro. These two halves are held together by machine screws 14a, 14b, 14c and 14d (see FIG. 6). It is recommended that the rotor be fabricated of a light nonmagnetic material such as aluminum with a hard surface such as a hard chromium plating will provide. This is not essential, however, and any suitable durable material will suffice. As is well known in the art, if such a rotor is run at a high speed, it becomes a gyroscope and will become space stabilized. (Speeds of around 6,000 r.p.m. have been found to be most satisfactory.) Therefore, the case 13, if rotated, will tend to move relative to the rotor, which maintains its original plane of rotation.

Referring to FIG. 3, capacitor pickoff plates 5a, 5b, 5c and 5d, of which there are two opposite pairs, are so oriented that each pair 5a, 5b and 5c, 5d will provide a signal indicative of motion of the gyroscope case about each of the two axes normal to the axis of rotor rotation. These pickoff plates are mounted in and insulated from the case by insulator ring 54, and are oriented as indicated in FIG. 3. The insulator ring is bonded to the case. Capacitors are formed between the pickoff plates 5a, 5b, 5c and 5d and the rotor 1. It is necessary that the spacing between the rotor and the case be very close to assure adequate pick off sensitivity of these capacitors.

As is well known in the art, the capacitance of a capacitor increases as its plates are brought closer together. In order to obtain usable capacitances for this application, it is necessary that the spacing between the rotor and the pickoff plates be in the neighborhood of .010 inch. For a minute motion of the case relative to the rotor on either axis normal to the rotation axis, the capacitances of oppositely oriented capacitors will change. The capacitor formed by the plate and adjacent portion of the rotor coming closer together will increase in capacitance while the opposite one with plate and rotor moving apart will decrease. Referring now to FIG. 4, these capacitors formed by the rotor 1 and the pickoff plates 5a and 5b, mounted on case 13, are connected across the primary winding of transformer 24. An oscillator 20 provides a reference signal. Neither the frequency of this oscillator nor its stability requirements are critical. Any suitable audio or radio frequency may be used. The capacitors formed between the pickoff plates and the rotor are effectively coupled between the oscillator and ground, through the path from the rotor 1, and the capacitance between the rotor and fixed center ball 12. If the two opposite capacitances are identical, then the current through each to ground will be the same. As the currents through the capacitors flow through the primary of the transformer 24 in opposite directions as indicated by the arrows, the resultant current in both primary and secondary of the transformer will be zero. If one capacitor has a greater capacitance than the other (due to movement of the gyro case), the current flow through it will be greater. There will then be a resultant current flow through the transformer bearing a phase relationship with the reference signal which depends on which capacitor is the greater. The amplitude of this current flow indicates the magnitude of this difference of capacitance. The resultant voltage in the transformer secondary is amplified and demodulated by amplifier-demodulator 22. The demodulator can be any accurate phase detector which will give a D.-C. output whose polarity indicates which capacitance is the greater and whose amplitude indicates the magnitude of the difference of capacitance. This output signal is fed to an appropriate position servo system 23 so as to drive the stable platform 25 on which the gyro case is mounted to correct the unbalance and again equalize the capacitances. In this manner, a platform can be kept stabilized in space at all times regardless of the angular rotation of the vehicle in which it is carried. Amplifier-demodulators and servo systems to accomplish this result are well known in the art. Trimmer capacitor 21 is used to adjust the circuit capacitance to compensate for errors in the system so that electrical balance is achieved when the rotor and stator are actually in their mechanical stabilized position.

Referring again to FIG. 1, rotatable stop pin 4 positively limits the motion of rotor 1 about the axes normal to the rotation axis. "Positive" limitation of the motion of rotor 1 about axes normal to the rotation axis indicates that there is provided physical structure which limits such motion of the rotor under all circumstances. That is, the rotor cannot rotate about an axis normal to its rotation axis in excess of that allowed by the "positive" limit stop. In a preferred embodiment, this stop pin is attached to a shaft 52 which is freely rotatable in ball bearing races 53a and 53b. For several reasons, a preferred form has the top and bottom of the rotor machined flat. One of these involves stability. Experimentation indicates that the moment of inertia about the spin axis should be larger than that about the cross axes for optimum stability. It is also necessary that we have two flat surfaces, in this instance formed by the bottom of the rotor and the case, to facilitate mechanization of a signal pickoff device. If the rotor were completely spherical, it would be more difficult to sense minute motion of the case relative to it. In order that the pickoff elements can be mounted in close proximity to provide usable capacitances and at the same time avoiding contact between case and rotor, it is necessary that the freedom of motion between case and rotor be limited to a few milliradians. Stable rotatable stop pin 4 acts to limit such motion. The stop pin must be freely rotatable so as to limit friction when the rotor comes into contact with it. The importance of the design of this pin was determined after considerable experimentation with various other types of fixed stop pins.

FIG. 8 illustrates a simple stop device consisting of a fixed pin 44 subtended from the rotor 42 into an indentation in the case of 43. Relative motion can be limited to any desired degree by the proper choice of pin and indentation dimensions. However, this type of stop pin will work satisfactorily only where the pin diameter is kept small as compared with the diameter of the case indentation. Rubbing friction occurs when the pin is brought into contact with the indentation producing a torque which causes the pin to roll around the inside of the indentation in a direction opposite to the spin. The precession velocity builds up until it is so large that the spinning of the rotor is stopped.

FIG. 9 illustrates another type of fixed stop device in which pin 46 is attached to the case 47 and fits into an indentation in the rotor 45. This stop is considerably better than that shown in FIG. 8 but still does not provide the stability required in a precision device such as an inertial navigator. When the rotor touches the pin, a component of angular momentum is generated which causes the rotor to wobble. At the same time the total momentum vector is precessed towards the axis of the pin and the rotor loses contact with the pin. Now, the rotor is in a condition of free precession due to the slight wobble generated by the torque impulse imparted by the momentary contact with the pin. The effective diameter of the hole is reduced by the amount of wobble present. With a second contact of pin and rotor the process repeats itself, the second torque impulse increasing the wobble set up by the first. Repeated contact of pin and rotor may reduce the effective diameter of the hole until the rotor and pin remain in continuous contact. The resultant friction will probably cause the rotor to bind. Experimentation indicates that such a stop will operate satisfactorily only if the following relationship exists:

$$\frac{A-C}{A} > \frac{r_p}{r_h}$$

where:

$r_p$ = pin radius, $r_h$ = hole radius
$A$ = moment of inertia about the spin axis
$C$ = moment of inertia about the cross axis This means that large freedom of movement must be provided between the case and rotor. In applications where such freedom is permissible this type of stop is usable. In the type of gyroscope allowing limited freedom of motion, it is unsatisfactory.

FIG. 10 illustrates the basic structural concepts of one type of freely rotatable stop pin which may be used in an embodiment of this invention where only limited freedom of motion between rotor and case is permissible. This consists of pin 51 freely rotatable on low friction ball bearing races 50a and 50b which are mounted on the case 49. The stop can be made stable with clearances between rotor 48 and pin 51 smaller than those required for any foreseeable design. The action of the low friction bearings is such as to greatly decrease the amplitude of the wobble induced when the gyro hits the pin. The only requirement is that the friction in the bearing be low and that the moment of inertia of the pin be very small in comparison to the moment of inertia of the gyro. In practice, the rotor does not usually grab the pin since less wobble is generated than in the case of the fixed pin. Even when it does grab, it causes the pin to rotate only until some transient disturbance occurs, at which time it loses contact and the gyro returns after a short damping period to its normal position.

There are various torques acting on the rotor which tend to remain constant. These include bias torques caused by such factors as asymmetry of the gas bearing due to the geometric shape of the bearing parts or asymmetry in the magnetic field of the motor stator and torques due to the earth's rotation. Referring to FIGS. 1 and 6, these are compensated for by the eddy current torquer which includes four windings, 6a, 6b, 6c, 6d, operating in oppositely oriented pairs (6a, 6b and 6c, 6d). The torque flux ring 7 which is fabricated of a suitable magnetic material and is fixed to the case 13 provides a flux path for the magnetic field generated by the torquer windings. Eddy currents to provide the driving torque are generated in electrically conductive nonmagnetic sleeve 8 which is attached to the rotor. This sleeve may be fabricated of a material such as manganin, an alloy comprised of copper, manganese and nickel which changes very little in resistance with temperature. The torque generated which acts on the rotor through the sleeve 8 is proportional to the product of the flux density and the eddy current in the sleeve. But the eddy current itself is proportional to flux density; hence, torque is proportional to the square of the flux density or to the square of the current in each coil winding.

With opposite coils energized simultaneously, the net torque about the transverse axis is proportional to the difference of the squares of the two currents. Referring to FIG. 5, a push-pull torquer control circuit which may be utilized is illustrated. The difference between the two currents is maintained constant, and the precession rate is a linear function of this difference. A fixed direct current supply 26 provides the bias current necessary to compensate for the particular situation at hand. Variable resistor 27 is used to adjust the current in torquer bias coils 6a and 6b to any desired difference relationship. This difference can be read on an ammeter 30 in series with the current feed to both coils as indicated.

If we have equal currents in windings 6a and 6b there will be no net torque acting on the gyro rotor via the sleeve 8. A greater current in one winding will result in a rotor torque, the direction of this torque depending on which winding has this greater current. This torque is proportional to the magnitude of the difference of the squares of the current in the two windings. By adjustment of variable resistor 27, a constant torque of the desired direction and magnitude can be generated. Windings 6c and 6d, oriented normal to 6a and 6b have identical control circuitry and operate in the same manner. The two torquing forces generated by 6a, 6b and 6c, 6d respectively can be adjusted so that they are equal and opposite to constant error torques due to the earth's motion and to the electrical and mechanical imperfections in the gyro itself. In this manner, gyro errors due to such error torques can be minimized.

Referring to FIGS. 1 and 6, adjusting screws 29a, 29b, 29c, 29d, 29e, 29f, 29g, and 29h are used to balance the rotor. As in any device of this type, it is essential that the rotating member be balanced precisely radially, axially and dynamically, and these adjustments must be made to achieve this end. Eight adjusting screws spaced equally around the flywheel portion of the rotor and positioned as indicated in FIG. 6 will be adequate if four are used for radial and axial balance and four for dynamic balance. Radial balance can be achieved by removing material from the appropriate sets of balance screws while axial and dynamic balance can be accomplished by repositioning appropriate sets of screws along the rotation axis. Dynamic balance is essential to eliminate sinusoidal interference at the rotor frequency in the pickoff signal.

Referring to FIG. 2, an embodiment of the invention with a centrally located spherical rotor is illustrated. The spherical gas bearing 38 which supports the rotor 31 is located between the rotor and the case 34. Motor field windings 18 are excited by an alternating current source (not shown). Flux ring 33 of laminated silicon steel which is fixedly mounted on the case 34 provides a flux path for the rotating magnetic field generated by the field windings.

The rotor may be fabricated of a nonmagnetic but electrically conductive material such as aluminum. Eddy currents are produced in the rotor by the rotating magnetic field generated by the field windings acting in conjunction with the flux ring. These eddy currents themselves generate a magnetic field which coacts with the field generated by the field windings and flux ring to produce a drive torque for the rotor.

Pickoff plates 32 of which there are two opposite pairs, function similarly to that described for the embodiment illustrated in FIG. 1, and the same circuitry as that illustrated in FIG. 4 and already described may be used to maintain alignment of rotor and case. The pick-off plates 32 are mounted in an insulator ring 17 to insulate them from the case in the same manner as in the embodiment illustrated in FIG. 1.

No eddy current torquer is shown in this embodiment, but may be added if additional accuracy is desired. Stable stop pin 35 is freely rotatable on ball bearing races 16a and 16b and limits rotor motion in the same manner as described for the first embodiment. Only one balancing adjustment screw 37 need be used.

This second embodiment is simpler and easier to fabricate than the first, and although it is not as precise as the embodiment illustrated in FIG. 1, it can be used where the application does not demand the additional complexity.

Although this invention has been described and illustrated in detail, it is to be clearly understood that the same is by way of illustration and example only and is not to be taken by way of limitation, the spirit and scope of this invention being limited only by the terms of the appended claims.

1. In a gyroscope, a rotor at least a portion of which is fabricated of a nonmagnetic material, and at least a portion of which has high electrical conductivity, a case surrounding said rotor, at least a portion of said case comprising a spherical member to which said rotor is externally concentric, said rotor having a spherical surface adjacent to said spherical case member said spherical surface of said rotor having tapered wedge-shaped pads etched thereon, whereby a spherical gas bearing to support said rotor is formed between said rotor spherical surface and said spherical member of said case, motor field windings wound on a magneic core fixedly mounted on said case in proximity to said electrically conductive rotor portion, alternating current means for exciting said field windings to drive said rotor about a predetermined rotation axis, an insulating ring, two pairs of oppositely oriented electrically conductive pickoff plates mounted therein, said rotor having flat surfaces normal to said rotation axis, said insulating ring being bonded to said case and positioned adjacent and parallel to one of said flat surfaces, electrical means connected to each of said pairs of pickoff plates for generating a direct current whose polarity indicates which of said plates is closer to said rotor than its paired opposite and whose magnitude indicates the difference of the capacitance between each of said plates and said rotor and that of its paired opposite, a ball bearing race fixedly mounted on said spherical case member, a shaft set in the rotatable portion of said ball bearing race, a stop pin mounted on said shaft, said rotor having a circular recess, said stop pin oriented with its rotation axis parallel to said rotor rotation axis and positioned in said recess for limiting motion of said rotor normal to said rotor rotation axis, two pairs of torquing windings each winding of a pair located on opposite sides of said rotation axis, and said pairs being located around said axis at right angles to each other, said windings adjacent said rotor for causing rotor torque, and a constant direct current source feeding each of said windings.

2. In a gyroscope, a rotor at least a portion of which is fabricated of a nonmagnetic material, and at least a portion of which has high electrical conductivity, a case surrounding said rotor, at least a portion of said case comprising a spherical member to which said rotor is externally concentric whereby a spherical gas bearing to support said rotor is formed between said rotor and said spherical member of said case, motor field windings wound on a magnetic core fixedly mounted on said case in proximity to said electrically conductive rotor portion, alternating current means for exciting said field windings to drive said rotor about a predetermined rotation axis, capacitive pickoff means comprising an insulating ring, two pairs of oppositely oriented electrically conductive plates being mounted therein, said pairs of plates being mutually perpendicular and normal to said rotation axis, said rotor having flat surfaces normal to said rotation axis, said insulating ring being bonded to said case and positioned adjacent and parallel to one of said flat surfaces, and electrical means connected to each of said pairs of pickoff plates for generating a direct current whose polarity indicates which of said plates is closer to said rotor than its paired opposite and whose magnitude indicates the difference of capacitance between each of said plates and said rotor and that of its paired opposite, rotatable stable stop means mounted on said case for limiting motion of said rotor normal to said rotation axis, and means for providing constant torque to said rotor to compensate for error torques.

3. In a gyroscope, a rotor at least a portion of which is fabricated of a nonmagnetic material, and at least a portion of which has high electrical conductivity, a case surrounding said rotor, at least a portion of said case comprising a spherical member to which said rotor is externally concentric, a spherical gas bearing to support said rotor being formed between said rotor and said spherical member of said case, motor field windings wound on a magneic core fixedly mounted on said case in proximity to said electrically conductive rotor portion, alternating current means for exciting said field windings to drive said rotor about a predetermined rotation axis, capactive pickoff means comprising an insulating ring, two pairs of oppositely oriented electrically conductive plates being mounted therein, said pairs of plates being mutually perpendicular and normal to said rotation axis, said rotor having flat surfaces normal to said rotation axis, said insulating ring being bonded to said case and positioned adjacent and parallel to one of said flat surfaces, and electrical means connected to each of said pairs of pickoff plates for generating a direct current whose polarity indicates which of said plates is closer to said rotor than its paired opposite and whose magnitude is proportional to the difference of capacitance between each of said plates and said rotor and that of its panel opposite, and means for providing a constant torque to said rotor to compensate for error torques.

4. A free rotor gyroscope comprising a case having an external portion and an internal portion fixedly cantilevered at one end thereof to said external portion, said internal portion having a substantially spherical bearing surface, a rotor within said external case portion and substantially surrounding said fixed internal case portion, said rotor having a rotor bearing surface complementary to and in close proximity to said first-mentioned surface, said surfaces including means for providing an autolubricated gas spin bearing therebetween upon rotation of said rotor about a rotor spin axis, a stop member journalled on and positioned at the other end of said cantilevered internal case portion for rotation about an axis substantially parallel to said spin axis, and a recess formed on said rotor for cooperating with said stop member to limit said relative pivotal motion of said rotor and case, said stop member having a maximum diameter less than the diameter of said recess, and having a maximum extent considerably less than the extent of said rotor in a direction substantially parallel to said spin axis.

5. A free rotor gyroscope comprising a case having an external portion and an internal spherical portion fixedly cantilevered at one end thereof to said external portion, said internal portion having a substantially spherical bearing surface, a rotor within said external case portion and substantially surrounding said fixed internal case portion, said rotor having a rotor bearing surface complementary to and in close proximity to said first-mentioned surface, said surfaces including means for providing an auto-lubricated gas spin bearing therebetween upon rotation of said rotor about a rotor spin axis, said rotor and case having mutually spaced and closely juxtaposed substantially flat surface portions extending substantially normal to said spin axis, capacitance means including at least part of said flat surface portions for sensing relative pivotal motion of said rotor and case about an output axis substantially normal to said spin axis, a stop member journalled on and positioned at the other end of said cantilevered internal case portion for rotation about an axis substantially parallel to said spin axis, and a recess formed on said rotor for cooperating with said stop member to limit said relative pivotal motion of said rotor and case to an extent which prevents contact between said flat surface portions, said stop member having a maximum diameter less than the diameter of said recess, and having a maximum extent considerably less than the extent of said rotor in a direction substantially parallel to said spin axis.

6. A free rotor gyroscope comprising a case having an external portion and an internal portion fixedly secured to said external portion, said internal portion having a substantially spherical bearing surface, a rotor within said external case portion and substantially surrounding said fixed internal case portion, said rotor having a rotor bearing surface complementary to and in close proximity to said first mentioned surface, means including said surfaces for providing a bearing therebetween supporting the rotor for rotation about a rotor spin axis, a stop member journalled on said internal case portion for rotation about an axis substantially parallel to said spin axis, a recess formed on said rotor for cooperating with said stop member to limit relative pivotal motion of said rotor and case, said stop member having a maximum extent less than the extent of the rotor in the direction of the spin axis and having a maximum diameter less than the diameter of said recess, whereby the moment of inertia of said stop member is but a small fraction of the moment of inertia of said rotor, said stop member being dynamically passive and normally having a constant angular position relative to said case except upon contact of the stop member and rotor.

7. A free rotor gyroscope comprising a case element having a rigidly fixed part thereof forming a substantially spherical bearing surface, a rotor element in said case element having a rotor bearing surface complementary to and in close proximity to said first-mentioned surface, said surfaces including means for providing an autolubricated gas spin bearing therebetween upon rotation of said rotor element about a rotor spin axis, a stop member journalled on one of said elements for rotation about an axis substantially parallel to said spin axis, and means on the other of said elements for cooperating with said stop member to limit relative pivotal motion of said elements about an axis substantially normal to said spin axis, said stop member normally having a constant angular position relative to said one element except upon contact between said stop member and said means on the other of said elements, said stop member having a maximum extent less than the extent of said rotor in the direction of said spin axis and having a moment of inertia considerably less than the moment of inertia of rotor.

8. A free rotor gyroscope comprising a case having an external portion and an internal portion fixedly secured to said external portion, said internal portion having a substantially spherical bearing surface, a rotor within said external case portion and substantially surrounding said fixed internal case portion, said rotor having a rotor bearing surface complementary to and in close proximity to said first-mentioned surface, said surfaces including means for providing an autolubricated gas spin bearing therebetween upon rotation of said rotor about a rotor spin axis, said rotor and case having mutually spaced and closely juxtaposed substantially flat surfaces extending substantially normal to said spin axis, means including at least a portion of said flat surfaces for sensing relative pivotal motion of said elements about an output axis substantially normal to said spin axis, a dynamically passive stop member journaled on said internal case portion for rotation about an axis substantially parallel to said spin axis, and means on said rotor for cooperating with said stop member to limit relative pivotal motion of said rotor and case about said output axis so as to prevent contact between said flat surfaces, said stop member having a maximum extent less than the extent of said rotor in the direction of said spin axis and having a moment of inertia considerably less than the moment of inertia of said rotor, said dynamically passive stop member being rotated solely by contact with said rotor.

References Cited by the Examiner

UNITED STATES PATENTS

| | | | |
|---|---|---|---|
| 1,986,807 | 1/1935 | Gillmor. | |
| 2,006,112 | 6/1935 | Reid | 74—5.7 X |
| 2,242,253 | 5/1941 | Lyman. | |
| 2,606,310 | 8/1952 | Baker. | |
| 2,695,198 | 11/1954 | Brugger | 302—9 |
| 2,720,115 | 10/1955 | Wing | 74—5.6 |
| 2,729,106 | 1/1956 | Mathiesen | 74—5 |
| 2,785,573 | 3/1957 | Bentley | 74—5 |
| 2,786,357 | 3/1957 | Quermann | 74—5.7 |
| 2,852,208 | 9/1958 | Schlesman. | |

FOREIGN PATENTS 1,078,691  5/1954  France.

MILTON KAUFMAN, *Primary Examiner.*

SAMUEL BOYD, ARTHUR M. HORTON,
*Examiners.*

D. D. DOTY, R. F. STAHL, P. W. SULLIVAN,
*Assistant Examiners.*